(12) United States Patent
Lowder

(10) Patent No.: US 6,235,378 B1
(45) Date of Patent: May 22, 2001

(54) COMPOSITE MAGNETIC SHEET

(76) Inventor: James T. Lowder, 363 Westland Ave., Columbus, OH (US) 43209

( * ) Notice: Subject to any disclaimer, the term of this patent is extended or adjusted under 35 U.S.C. 154(b) by 0 days.

(21) Appl. No.: 09/190,769

(22) Filed: Nov. 12, 1998

(51) Int. Cl.⁷ ..................................... B32B 15/08
(52) U.S. Cl. .................. 428/215; 428/457; 428/458; 428/459; 428/460; 428/461; 428/462; 428/463; 428/464; 428/465; 428/466; 428/692; 428/332; 428/425.8
(58) Field of Search ............... 428/425.8, 457–466, 428/692, 900, 215, 332

(56) References Cited

U.S. PATENT DOCUMENTS

| | | |
|---|---|---|
| 1,985,480 * | 12/1934 | Carpenter . |
| 2,258,106 * | 10/1941 | Bryce . |
| 2,418,479 | 4/1947 | Pratt et al. . |
| 2,961,365 * | 11/1960 | Sroog . |
| 3,093,919 * | 6/1963 | Holtz . |
| 3,210,080 | 10/1965 | Rael et al. . |
| 3,300,329 | 1/1967 | Orsino et al. . |
| 3,413,135 | 11/1968 | Matson . |
| 3,503,882 | 3/1970 | Fitch . |
| 3,619,227 | 11/1971 | Tomkinson . |
| 3,654,711 * | 4/1972 | Taylor . |
| 3,954,482 | 5/1976 | Novack . |
| 4,105,118 * | 8/1978 | Williams, Jr. . |
| 4,129,548 | 12/1978 | McDonnell . |
| 4,174,419 * | 11/1979 | Nienart . |
| 4,421,660 | 12/1983 | Hajna . |
| 4,584,223 * | 4/1986 | Krapf . |
| 4,597,801 | 7/1986 | Stratta . |
| 4,606,848 | 8/1986 | Bond . |
| 4,661,395 * | 4/1987 | Akao . |
| 4,834,800 | 5/1989 | Semel . |
| 5,112,403 | 5/1992 | Okura et al. . |
| 5,476,559 * | 12/1995 | Chiro . |
| 5,609,788 | 3/1997 | Deetz . |

* cited by examiner

Primary Examiner—Stevan A. Resan
(74) Attorney, Agent, or Firm—Jason H. Foster; Kremblas, Foster, Millard & Pollick

(57) ABSTRACT

A composite sheet including a first polymer layer laminated to the first major surface of a ferromagnetic substrate having opposing first and second major surfaces. A second polymer layer is laminated to the second major surface of the substrate, sandwiching the substrate between the first and second polymer layers. The substrate is preferably steel having a thickness preferably between about 1 to 3 mils. A significant advantage of the composite sheet is the increase in the utility of the composite sheet due to the composite structure.

20 Claims, 1 Drawing Sheet

COMPOSITE MAGNETIC SHEET

BACKGROUND OF THE INVENTION

1. Field of the Invention

This invention relates to magnetic surfaces, and more particularly to a flexible sheet having a magnetic surface. The flexible sheet is safe to handle and able to be cut with common hand tools, such as scissors.

2. Description of the Related Art

In many situations, it is desirable to have a magnetic surface: one to which magnets are attracted and may be attached. For example, in a classroom teachers often must display instructive material to students, but also keep their hands free to write. Large magnetic boards are available for such a purpose, but these must attach to a wall, or rest on an easel.

Magnetic products that are packaged for retail display are commonly mounted to a steel sheet to maintain their relative positions in the package. The steel sheet must be inexpensive, because it will be discarded after it is removed from the packaging. Inexpensive steel sheets are presently sold by Magna Visual, Inc. with MAGNA CHART brand magnetic visual aids. The steel sheets are paper-coated and about 3 to 6 mils thick with admittedly sharp, dangerous edges as evidenced by a warning on the label of the retail packages. The steel is apparently paper coated for appearance purposes and some corrosion resistance, which is due mostly to the adhesive used to mount the paper to the steel.

Sheet steel is also conventionally sandwiched into paper board products for game boards and wall boards sold by Kling Magnetic of Hudson, N.Y. The thickness of the steel sheet ranges from about 3 to 6 mils (0.003 to 0.006 inch). These products are also considered unsafe for ordinary handling due to sharp edges.

In U.S. Pat. No. 5,609,788, Deetz describes a paint composition into which ferrous particles are suspended. Surfaces coated with this paint will attract magnets and hold them in place. Thus, a wall or other surface can be painted to look and function in an ordinary manner, but also provide a magnetic surface. However, the amount of ferrous particles mixed in the paint is limited because the paint must remain spreadable. Therefore, the attraction of a magnet to the painted wall or other surface is relatively small, which becomes a problem if somewhat heavier items must be attached to them. Ten mils of this paint is about 50% as effective in attracting magnets as a 2 mil steel substrate.

Therefore, a long felt need exists for a thin magnetic sheet that is inexpensive, safe for normal or typical handling and convenient to use for a variety of educational, entertainment, and packaging applications which has not been satisfactorily solved by prior efforts.

SUMMARY OF THE INVENTION

The invention comprises a composite sheet. A first polymer layer is laminated to the first major surface of a ferromagnetic substrate having opposing first and second major surfaces. In a preferred embodiment, a second polymer layer is laminated to the second major surface of the substrate, sandwiching the substrate between the first and second polymer layers. The substrate is preferably steel about 3 mils, and preferably about 1 or 2 mils thick.

A significant advantage of the composite sheet is the increased safety for typical handling of the sheet by hand without the need for protective gloves or the like. The polymer layers dull the edges of the steel sheet. Additionally, the composite sheet can be cut easily with scissors, enhancing the ability of the individual user to modify the sheet to his or her needs. Even after the composite sheet has been cut with scissors, it is significantly less likely to cut the user than the steel sheet alone or prior art paper coated steel sheet. This is due to the dulling effect to the edges of the sheet caused by the polymer layers laminated to the steel substrate without the stiffening effect some adhesives and paper have.

An additional advantage is that the polymer layers laminated to the substrate also greatly increase the corrosion resistance. Corrosion of the substrate tends to diminish the appearance of the sheet which is important in many commercial applications.

The present invention results in a safe sheet that has twice the magnetic attraction of the magnetic paint, in one half the thickness. The present invention is also able to be used in a broader range of applications, due to the broad range of adhesives that will adhere to the laminate.

Figure 1:
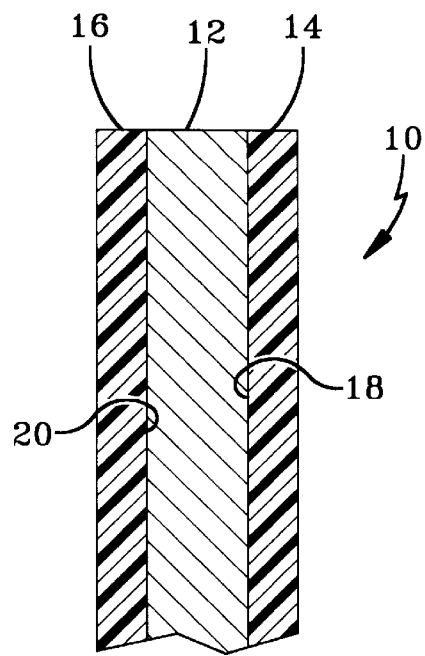
FIG. 1 is a side view illustrating the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DESCRIPTION OF THE PREFERRED EMBODIMENT

The preferred composite sheet 10 is shown in FIG. 1. The composite sheet 10 includes a ferromagnetic substrate 12, and polymer layers 14 and 16 laminated to opposing major surfaces 18 and 20. It is contemplated that only one of the major surfaces 18 and 20 has a polymer layer.

The substrate 12 is preferably a steel sheet with a thickness of about 2 mils (0.002 inch). The substrate 12 could alternatively be 1 mil or thinner, but preferably is no thicker than about 3 mils. Ferromagnetic is defined as a material that is attracted to a magnet, or can become a magnet itself by magnetization. Materials which are strongly magnetic are included as ferromagnetic.

Figure 2:
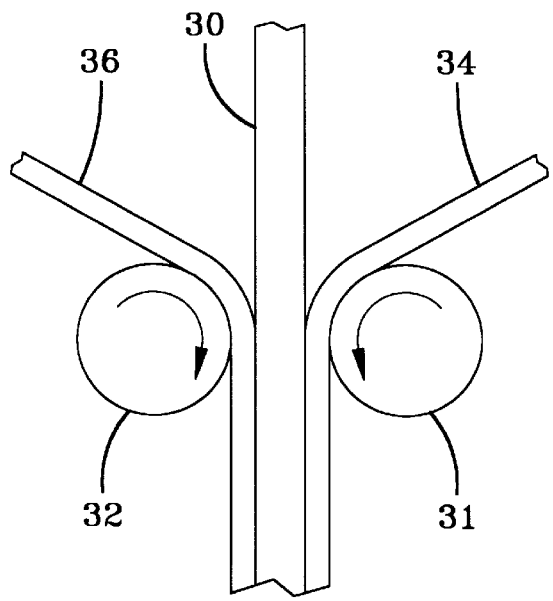
FIG. 2 is a side view illustrating a method of forming the preferred embodiment of the present invention.

The composite sheet 10 can be formed in many processes. One method, illustrated in FIG. 2, involves passing a steel sheet substrate 30 through a pair of opposed rollers 31 and 32. A first polymer sheet 34 extends through the rollers 31 and 32 between the substrate 30 and the roller 31. A second polymer sheet 36 extends through the rollers 31 and 32 between the substrate 30 and the roller 32. In this method, the substrate 30 is sandwiched between the polymer sheets 34 and 36, producing a finished product similar to the composite sheet 10 shown in FIG. 1.

Figure 3:
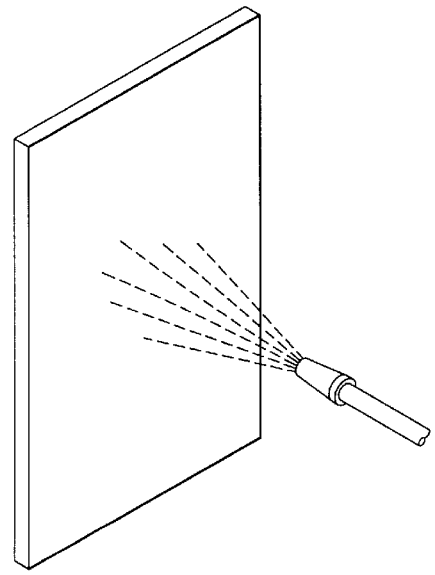
FIG. 3 is a view in perspective illustrating an alternative method of forming the preferred embodiment of the present invention.

Many alternative methods of forming the composite sheet 10 shown in FIG. 1 are contemplated. For example, a method of contacting the steel sheet substrate with a liquid polymer and subsequently cooling or curing the liquid to form a polymer layer laminated to the steel substrate could be performed using various steps. A liquid polymer could be spray coated onto the steel substrate, as shown in FIG. 3. Alternatively, vapor deposition, extrusion, casting and other methods are contemplated. Roll laminating using liquid adhesives or polymeric coatings is also contemplated.

There are many polymer materials that can be laminated to the surface of the steel substrate. Any of the commonly used laminating polymers can be used for the present invention, including those used with desktop and industrial grade laminating equipment. Such polymers should be relatively elastic, to prevent significant stiffening of the laminated sheet for reasons described below.

The polymer layers 14 and 16 are preferably about 1.5 mils thick, but could also be thicker or thinner, such as 1 to 1.8 mils thick, with corresponding advantages and disadvantages that will become apparent to one skilled in the art from this description. Magnets are still attracted strongly to a steel sheet of about 2 mils even when polymer layers laminated to it are up to 20 mils (0.020 inch) thick. The laminated polymer layer can be transparent, translucent or opaque, depending upon the appearance desired for the finished product. The substrate can have printing or other visible features, which would make a transparent or translucent polymer coating preferable. The list of candidate coatings to accomplish the described invention is extensive and includes, but is not limited to, polyesters, polypropylenes, vinyls, styrenes, acrylics, acetates, polystyrenes, rubbers, silicones, polyethers applied by heated or cold rolling, liquid or solid, polymeric curing or solvent based drying.

Figure 4:
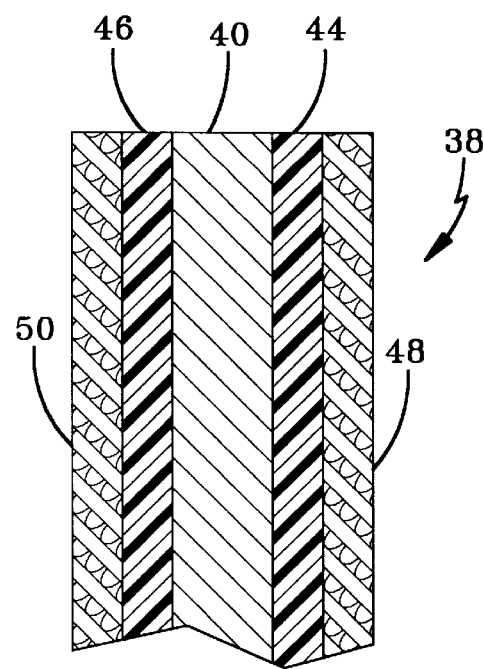
FIG. 4 is a side view illustrating an alternative embodiment of the present invention.

Instead of a polymer-only layer laminated to the substrate as in the preferred embodiment, a preformed multi-layer laminate could alternatively be used to coat the substrate. Such a laminate could be a fusible polymer, polyester and paper laminate that is presently sold for covering book jackets. This laminate can be mounted to both sides of the substrate, or only one side with the ordinary polymer layer laminated on the opposite side. This alternative structure fora magnetic sheet 38 is shown in FIG. 4. The steel sheet substrate 40 has polymer layers 44 and 46 laminated to its opposing sides. The paper layers 48 and 50 are laminated to the outer surfaces of the polymer layers 44 and 46.

Of course, it is possible to laminate only one of the sides of a substrate with the polymer/paper laminate and the other side with the polymer only. Additionally, the polymer and paper laminated sheet 38 could be formed by first laminating the substrate with polymer layers, and then laminating it with paper in a second step.

The polymer layers 44 and 46 dull the edges of the alternative composite sheet 38 shown in FIG. 4 in the same manner as previously described to provide a safer product for ordinary handling during use. The composite sheet 38 also has the advantage over the uncoated ferromagnetic sheet in that it can be adhered to many surfaces by a broader range of adhesives. With the addition of the paper layer, the range of adhesives is even greater, including white and wallpaper paste. The composite sheet 38 can be pasted to a conventional wall, and ordinary wallpaper can be pasted over it. This gives the wall a conventional appearance, but with the ability to mount magnets to it.

Uses for the preferred or alternative embodiments of the present invention include business card sized composite sheets, banners that are 1 foot tall and 10 feet long, and rolls that are hundreds of meters long. Other sizes can be made, too. If the substrate material is magnetically "hard," which means it is able to accept and retain a magnetic charge, it can be magnetized so that pieces of ferromagnetic material can be attached to it, which would increase the number of uses.

A significant advantage provided by the present invention is a decrease in the tendency of the composite sheet to cut a person who is handling it. Because educational materials are often handled by children and young adults, it must be safe even if it is used for a purpose for which it was not designed. For example, one use of the preferred composite sheet is as an insert between two pieces of colored paper that are also to sandwich the sheet between them. The finished composite sheet can be punched for insertion in a loose-leaf binder so that the binder can be opened and magnetic objects, such as letters, can be attached to the composite sheet. Such a "magnetic page" embodying the present invention weighs less than one ounce, when employing a substrate of 1 mil steel.

If a student decides to cut the composite sheet having a thickness such as described herein with scissors or a paper cutter, problems would arise if the resulting edge were razor-sharp. With the present invention, however, the edge remaining after being cut is dulled by the presence of the polymer lamination and surprisingly significantly less likely to cut a person than the steel substrate prior to laminating. A cut edge of a composite sheet embodying the present invention also has significantly less likelihood of cutting a person than the prior art paper-coated metal sheets.

The reason for, and the extent of, the "dulling"of the edge of the steel substrate with the present invention are not fully understood. However, the inventor has postulated a theory he believes explains the dulling effect. Without limiting the scope of the present invention the theory is as follows.

In general, the tendency of a steel sheet to cut is based upon two characteristics: the sharpness of the steel sheet's edge and the stiffness of the steel sheet. The sharpness of the steel sheet's edge is affected by the thickness of the steel sheet. For example, the thinner a sheet is, the sharper its edge is. Extremely thin metal sheets are extraordinarily sharp simply by virtue of how thin they are. No jagged edge is necessary for the sheet to cut a person.

When the polymer layers laminated to the steel substrate bond well and stay intact at the sharp edge, the edge of the substrate has an effective thickness equal to the sum of the thicknesses of the sheet and the polymer layers. The polymer layers make the laminated sheet thicker and this thicker edge reduces the ability of the laminated structure to cut.

The stiffness of the laminated sheet also affects the sheet's tendency to cut a person. A less stiff sheet tends to buckle at its edge rather than retain its shape. The thin polymer layers laminated to the substrate represent highly flexible layers which increase the thickness of an exposed edge while adding a relatively small increase in the stiffness of the composite sheet, compared for example, to the same thickness in steel or even a paper laminate. If the sheet buckles, the sharp edge does not stay in contact with the handler's skin. Instead, the buckled edge portion of the sheet tends to align itself parallel to the surface of the handler's skin, which prevents or at least reduces cutting. Therefore, when a force is applied to a highly pliable sheet, it tends to buckle, rather than retain its shape. The reason a knife is effective in cutting is that it is stiff enough to keep the cutting edge in contact with the material being cut as a force is applied. If the laminated sheet does not act as a knife and instead buckles, it will not inflict a significant cut.

Therefore, a sheet is less likely to cut a person as the sheet's thickness increases (more dull edge) and stiffness decreases (more likely to buckle). However, as the polymer layers are added to increase thickness, stiffness increases making it less likely to buckle. Therefore, a careful balance between the two factors is required so that the composite sheet has the best thickness and pliability.

The invention is based upon the discovery that if a layer of polymer approximately ⅓X to 2X thick is adhered to each opposite side of a steel substrate having a thickness of X (where X is less than or equal to about 3 mils), the sharp substrate edge is effectively dulled to dramatically reduce the tendency to cut, while increasing the sheet's stiffness only a nominal amount. Stated simply, the polymer layers added according to the above equation dull the edge without significantly increasing stiffness. The result is a relatively thin composite sheet that can be handled safely during use and may be easily cut with scissors or the like and remain safe for handling.

Because the polymer layers are flexible, the sheet can be deformed, such as by elongation, even after being laminated. Furthermore, the preferably nonporous polymer layers provide the benefit of corrosion protection by sealing off the steel substrate from the surrounding environment.

The advantages provided by the present composite sheet point to a structure that is suited to a greater number of useful applications than the prior art structures. Additionally, when used in those applications, the composite sheet is less expensive due to the resulting structure.

For example, when sheet steel is to be bonded to most materials, it must be cleaned thoroughly prior to bonding. This is an additional step that adds to the cost of manufacturing due to the nature of the cleaning process.

However, when the steel sheet is laminated according to the present invention, no initial cleaning is necessary. Furthermore, after laminating according to the present invention, many of the materials that would not adhere to the steel alone will adhere to the laminate. This is due to the broader range of adhesives that will adhere to both the polymer layers and the other materials. Other examples exist pointing to the economic advantages of the present invention.

Examples of the present invention have been constructed. Selected examples are described below, and are not intended to limit the number of variations possible.

EXAMPLE 1

Steel shim stock, which is sold under the brand name PRECISION BRAND PRODUCTS, was obtained in the range of 1 to 12 mils (0.001–0.012 inch) thick by 6 inches wide in boxed coils. Rectangular segments about 4 inches by about 6 inches were cut, sandwiched between colored copy weight paper, and subsequently sandwich laminated in a 5 inch by 7 inch laminate pouch (3 mils thick) sold by USI, INC. This was accomplished in a pouch laminator of the same brand to create magnetic "boards." The attractive strength of these boards was tested subjectively with "refrigerator" sheet magnets. Each thickness of steel exhibited very strong attraction for the magnets. There was a noticeably stronger attraction for the heavier magnets by the thicker steels. The greatest difference was noticed between the 1 mil and thicker steels, although the 1 mil was adequate for the sheet magnets.

EXAMPLE 2

Twelve inch wide coils of 2 mil precision steel shim were obtained from PRECISION BRAND PRODUCTS and larger boards were produced than those described in Example 1. Classroom binder size pages were constructed with three holes punched along one side. Additionally, place-mat size and 24 inch by 36 inch wall charts were made. The wall chart composite was constructed with heavy 10 mil tag paper and laminated in a roll laminator. Each of these boards exhibited more than adequate retentive strength for sheet magnets of the "refrigerator" type.

EXAMPLE 3

A section of 2 mil PRECISION BRAND PRODUCTS steel shim stock was passed through a roll laminator, model ARL sold by USI, INC., using 1.5 mil laminate (consisting of 0.5 mil polyester and 1 mil fusible adhesive.) Good adhesion between the laminate and steel was achieved at an indicated temperature of 240 degrees Fahrenheit without cleaning the steel to remove rolling compound or lubricant. It was immediately perceived the resulting product, 4.5 mils thick, was easier and safer to handle than the uncoated steel. It cut easily with scissors or paper cutter and seemed to have a much safer edge than the uncoated steel. Subsequent sandwich constructions of the type described proceeded with no diminishment in magnetic attraction and with greater ease in handling.

EXAMPLE 4

A roll of 25 pounds of 2 mil PRECISION BRAND PRODUCTS steel shim stock was fed continuously through the USI laminator described in Example 3 with 1.3 mil USI Opti-Clear polyester laminate creating approximately 325 square feet of laminated steel at the rate of 9 feet per minute.

EXAMPLE 5

Two mil steel shim stock was laminated with 1.3 mil polypropylene roll film by USI with similarly strong adhesion.

EXAMPLE 6

Two mil steel shim stock was laminated with one or both sides covered with an opaque colored roll film supplied by USI, thus eliminating the need for a sandwich construction to impart a color to the "board." This product can be produced in considerable length.

EXAMPLE 7

Two mil steel shim stock was laminated with a product supplied by USI under the trademark POLY PAPER on one and both sides which provides first a polymer coating, then a paper coating. The resultant product is particularly adaptable to different adhesive systems. A sample of this product was adhered to wall board with wall paper paste, after which it was covered with wall paper. The resultant magnetic attraction of the wall papered surface was outstanding.

EXAMPLE 8

Various thicknesses of steel shim stock from 1 to 6 mils were coated with roll laminates of the polyester type up to 10 mil supplied by USI, INC. and the conclusions were as follows: each of these combinations possessed sufficient magnetic attraction to function well with sheet magnets. The thicker the laminate, the duller the edge but the stiffer it became.

While certain preferred embodiments of the present invention have been disclosed in detail, it is to be understood that various modifications may be adopted without departing from the spirit of the invention or scope of the following claims.

What is claimed is:

1. A composite sheet comprising:
   (a) a ferromagnetic substrate having a thickness between about 2 and about 5 mils, the substrate having opposing first and second major surfaces;
   (b) a first polymer layer laminated to the first major surface of the ferromagnetic substrate, said first polymer layer having a thickness between about 1 mil and about 15 mils; and
   (c) a second polymer layer having a thickness between about 1 mil and about 15 mils laminated to the second major surface of the ferromagnetic substrate, sandwiching the ferromagnetic substrate between the first and second polymer layers and forming a composite sheet peripheral edge that, when subjected to an in-plane force sufficient to cut human skin, will tend to buckle rather than cut skin.

2. A composite sheet in accordance with claim 1, wherein the ferromagnetic substrate comprises a steel sheet.

3. A composite sheet in accordance with claim 2, wherein the steel sheet is about 2 mils thick.

4. A composite sheet in accordance with claim 2, further comprising a first paper layer laminated to the first polymer layer, sandwiching the first polymer layer between the ferromagnetic substrate and the first paper layer.

5. A composite sheet in accordance with claim 4, further comprising a second paper layer laminated to the second polymer layer, sandwiching the second polymer layer between the ferromagnetic substrate and the second paper layer.

6. A composite sheet according to claim 1, wherein said composite sheet has an exposed edge between about 3 to 7 mils thick.

7. A composite sheet in accordance with claim 1, wherein the ferromagnetic substrate is permanently magnetized.

8. A composite sheet in accordance with claim 1, wherein the first and second polymer layers have a thickness between about one-third and about twice the thickness of the ferromagnetic substrate, thereby increasing the thickness of any exposed edge of the composite sheet without sufficiently increasing the stiffness thereof to reduce inadvertent cutting of human skin during typical handling and use of the composite sheet.

9. A composite sheet in accordance with claim 1, wherein the first and second polymer layers have a thickness between about 1 mil and about 10 mils.

10. A composite sheet in accordance with claim 9, wherein the first and second polymer layers have a thickness between about 1 mil and about 5 mils.

11. A composite sheet in accordance with claim 10, wherein the first and second polymer layers have a thickness between about 1 mil and about 3 mils.

12. A composite sheet in accordance with claim 11, wherein the first and second polymer layers have a thickness between about 1 mil and about 2 mils.

13. A method of making a composite sheet comprising
   (a) laminating a first polymer layer having thickness between about 1 mil and about 15 mils to a first major surface of a ferromagnetic substrate having opposing first and second major surfaces and a thickness between about 2 and about 5 mils; and
   (b) laminating a second polymer layer having a thickness between about 1 mil and about 15 mils to the second major surface of the ferromagnetic substrate, thereby sandwiching the ferromagnetic substrate between the first and second polymer layers and forming a composite sheet peripheral edge that, when subjected to an in-plane force sufficient to cut human skin, will tend to buckle rather than cut skin.

14. A method in accordance with claim 13, wherein the steps of laminating further comprise passing first and second polymer sheets and the ferromagnetic substrate between opposing rollers.

15. A method in accordance with claim 14, wherein each polymer layer is laminated to the ferromagnetic substrate by an adhesive.

16. A method in accordance with claim 14, wherein each polymer layer is laminated to the ferromagnetic substrate by heat bonding.

17. A method in accordance with claim 13, further comprising permanently magnetizing the ferromagnetic substrate.

18. A method of making a composite sheet, the method comprising:
   (a) coating a first major surface of a ferromagnetic substrate, having opposing first and second major surfaces and a thickness between about 2 mils and about 5 mils, with a polymer to form a first polymer layer having a thickness between about 1 mil and about 15 mils;
   (b) coating the second major surface of the substrate with a polymer to form a second polymer layer having a thickness between about 1 mil and about 15 mils, thereby sandwiching the ferromagnetic substrate between the first and second polymer layers and forming a composite sheet peripheral edge that, when subjected to an in-plane force sufficient to cut human skin will tend to buckle rather than cut skin.

19. A method in accordance with claim 18, wherein the step of coating comprises placing a liquid chosen from the group of monomer, polymer and solvent based system in contact with the ferromagnetic substrate and subsequently curing the liquid.

20. A method in accordance with claim 18, further comprising permanently magnetizing the ferromagnetic substrate.

* * * * *